(12) United States Patent
Wenk

(10) Patent No.: US 6,768,734 B2
(45) Date of Patent: Jul. 27, 2004

(54) DEVICE AND METHOD FOR EQUALIZING DATA DELAYS

(75) Inventor: Christian Wenk, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/168,368

(22) PCT Filed: Dec. 14, 2000

(86) PCT No.: PCT/DE00/04461
§ 371 (c)(1),
(2), (4) Date: Jun. 17, 2002

(87) PCT Pub. No.: WO01/45454
PCT Pub. Date: Jun. 21, 2001

(65) Prior Publication Data
US 2003/0099230 A1 May 29, 2003

(30) Foreign Application Priority Data
Dec. 17, 1999 (DE) .......................... 199 61 131

(51) Int. Cl.[7] .......................... H04L 12/50; H04L 7/00; H04J 3/06; H04J 3/22
(52) U.S. Cl. ...................... 370/366; 370/503; 370/515; 370/465; 375/367; 375/371
(58) Field of Search ................................ 370/366, 378, 370/417, 422, 504, 505, 510, 513, 514, 515, 517; 375/363, 365, 368, 371, 372

(56) References Cited

U.S. PATENT DOCUMENTS

| | | | | |
|---|---|---|---|---|
| 4,179,587 A | * | 12/1979 | Herschtal | 370/378 |
| 4,603,416 A | * | 7/1986 | Servel et al. | 370/417 |
| 4,811,367 A | * | 3/1989 | Tajika | 375/368 |
| 5,040,195 A | * | 8/1991 | Kosaka et al. | 375/365 |
| 5,140,618 A | * | 8/1992 | Kinoshita et al. | 375/368 |
| 5,305,322 A | * | 4/1994 | Kabaya et al. | 370/505 |
| 5,442,405 A | * | 8/1995 | Taniguchi et al. | 348/525 |
| 5,583,894 A | * | 12/1996 | Linsley | 375/372 |
| 5,710,774 A | * | 1/1998 | Suh et al. | 370/513 |
| 5,877,815 A | * | 3/1999 | Tsujimura | 348/515 |
| 6,215,798 B1 | * | 4/2001 | Carneheim et al. | 370/515 |

FOREIGN PATENT DOCUMENTS

| | | |
|---|---|---|
| DE | 41 32 518 | 4/1993 |
| GB | 1 412 136 | 10/1975 |
| JP | 6-204979 | 7/1994 |
| JP | 9-275576 | 10/1997 |

OTHER PUBLICATIONS

Patent Abstracts of Japan vol. 14, No. 051 Jan. 30, 1990.

* cited by examiner

*Primary Examiner*—Man Phan
(74) *Attorney, Agent, or Firm*—Bell Boyd & Lloyd LLC

(57) ABSTRACT

A device and a method for equalizing data delays in a multiplicity of serial input data streams switched by a switching network in a telecommunication switching system, wherein the multiplicity of data word synchronization units are used for synchronizing a multiplicity of input data streams at a data word level into a multiplicity of synchronized parallel input data streams.

14 Claims, 4 Drawing Sheets

FIG 2

| Block | 0 | 1 | 2 | 3 | 4 | 8 | 16 | 17 | 18 | 32 | 64 | 65 | 66 | 67 | 68 | 127 |
|---|---|---|---|---|---|---|---|---|---|---|---|---|---|---|---|---|
| 0 | synw0 | synw1 | synw2 | synw3 | asw0 | asw1 | asw2 | tstch | tstch | asw3 | asw4 | tstch | tstch | tstch | tstch | tstch |
| 1 | asw5 | tstch | tstch | tstch | tstch | tstch | tstch | payld | payld | tstch | tstch | tstch | tstch | tstch | tstch | tstch |
| 2 | asw6 | tstch | tstch | tstch | tstch | tstch | tstch | payld | payld | tstch | tstch | tstch | tstch | tstch | tstch | tstch |
| 3 | tstch | tstch | tstch | tstch | tstch | tstch | tstch | payld | payld | tstch | tstch | tstch | tstch | tstch | tstch | tstch |
| 4 | asw7 | tstch | tstch | tstch | tstch | tstch | tstch | payld | payld | tstch | tstch | tstch | tstch | tstch | tstch | tstch |
| 5 | tstch | tstch | tstch | tstch | tstch | tstch | tstch | payld | payld | tstch | tstch | tstch | tstch | tstch | tstch | tstch |
| 6 | tstch | tstch | tstch | tstch | tstch | tstch | tstch | payld | payld | tstch | tstch | tstch | tstch | tstch | tstch | tstch |
| 7 | tstch | tstch | tstch | tstch | tstch | tstch | tstch | payld | payld | tstch | tstch | tstch | tstch | tstch | tstch | tstch |
| 8 | asw8 | tstch | tstch | tstch | tstch | tstch | tstch | tstch | tstch | tstch | tstch | tstch | tstch | tstch | tstch | tstch |
| 9 | tstch | tstch | tstch | tstch | tstch | tstch | tstch | payld | payld | tstch | tstch | tstch | tstch | tstch | tstch | tstch |
| 10 | tstch | tstch | tstch | tstch | tstch | tstch | tstch | payld | payld | tstch | tstch | tstch | tstch | tstch | tstch | tstch |
| 11 | tstch | tstch | tstch | tstch | tstch | tstch | tstch | payld | payld | tstch | tstch | tstch | tstch | tstch | tstch | tstch |
| 12 | tstch | tstch | tstch | tstch | tstch | tstch | tstch | payld | payld | tstch | tstch | tstch | tstch | tstch | tstch | tstch |
| 13 | tstch | tstch | tstch | tstch | tstch | tstch | tstch | payld | payld | tstch | tstch | tstch | tstch | tstch | tstch | tstch |
| 14 | tstch | tstch | tstch | tstch | tstch | tstch | tstch | payld | payld | tstch | tstch | tstch | tstch | tstch | tstch | tstch |
| 15 | tstch | tstch | tstch | tstch | tstch | tstch | tstch | payld | payld | tstch | tstch | tstch | tstch | tstch | tstch | tstch |
| 16 | asw9 | tstch | tstch | tstch | tstch | tstch | tstch | payld | payld | tstch | tstch | tstch | tstch | tstch | tstch | tstch |
| 17 | tstch | tstch | tstch | tstch | tstch | tstch | tstch | payld | payld | tstch | tstch | tstch | tstch | tstch | tstch | tstch |

Relative test channel address in the respective block

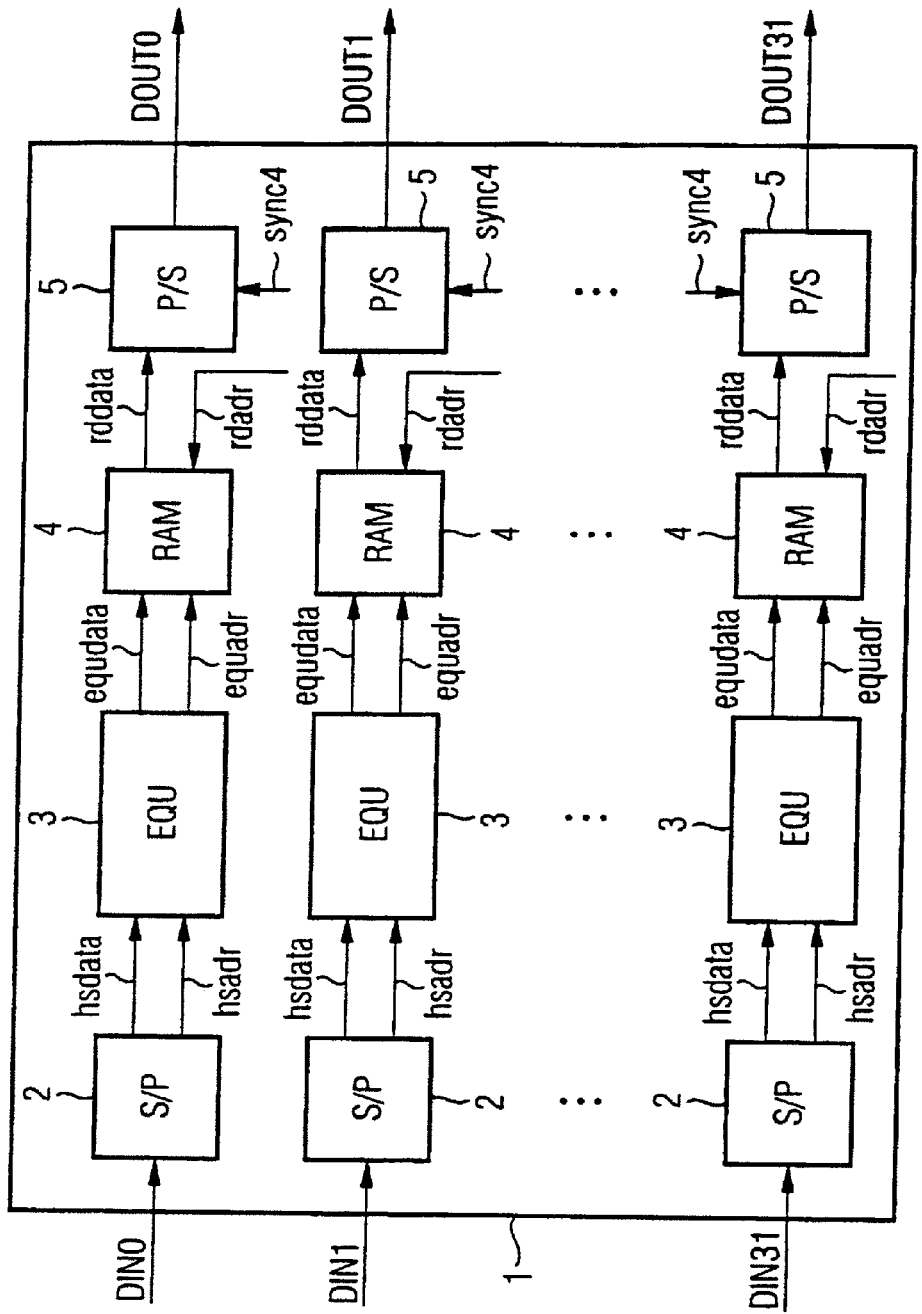

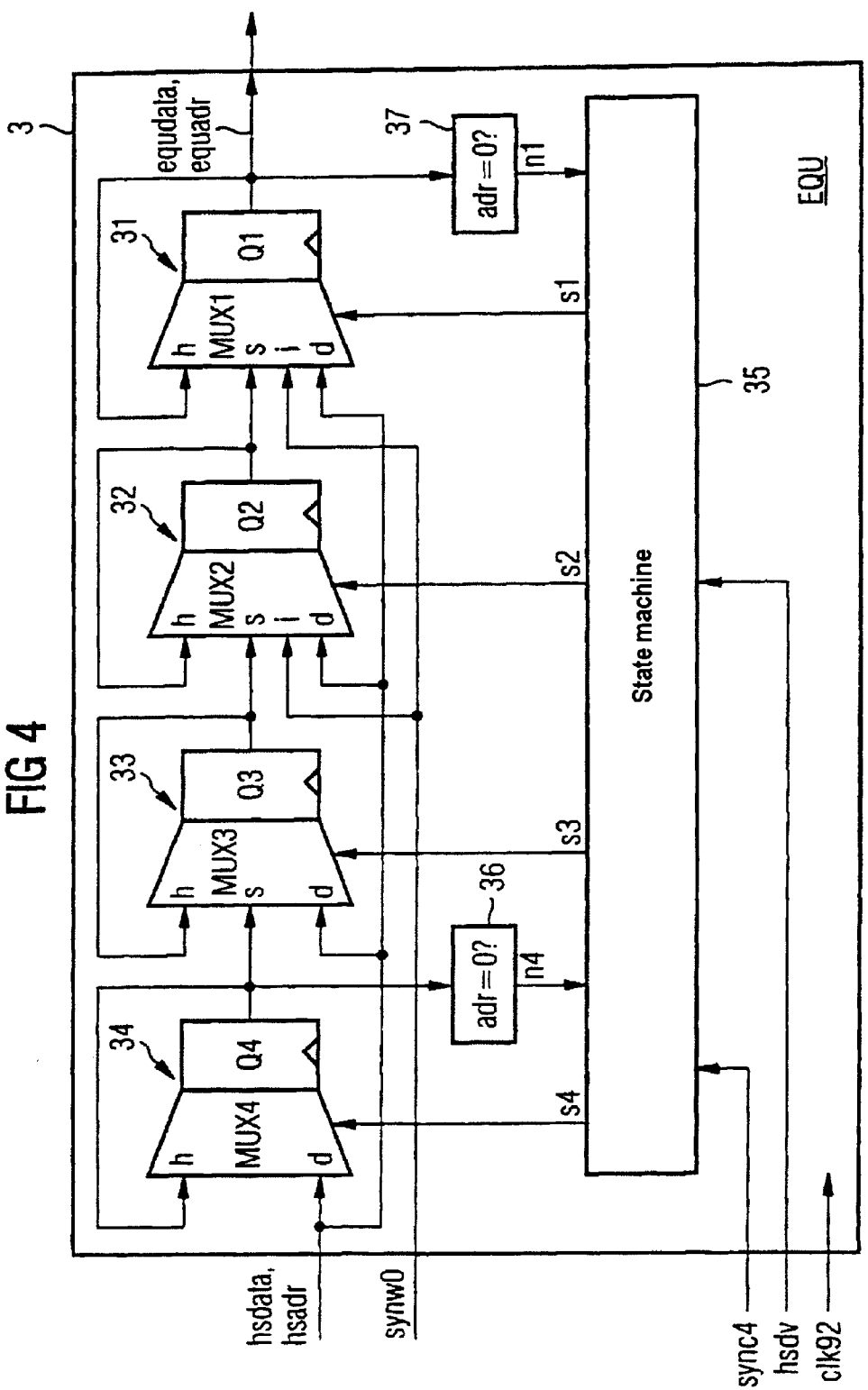

DEVICE AND METHOD FOR EQUALIZING DATA DELAYS

BACKGROUND OF THE INVENTION

The present invention relates to a device and a method for equalizing data delays in a multiplicity of serial input data streams switched, for example, by a switching network in a telecommunication switching system.

In particular, the present invention relates to a device and a method for equalizing data delays used, for example, in Type D of the Siemens EWSD switching system. This novel switching system is especially characterized by a compressed data stream in which, for example, 16 conventional line trunk groups are combined to form one data stream. One frame in a time-division multiplex system compressed in this manner preferably exhibits (in addition to 2×128 test channels) 16×128 payload channels with, in each case, 80 kbit/s. However, since different delays can occur for the 16 combined line trunk groups, a data frame having different lengths is obtained in the compressed data stream which is essentially composed of the data streams of the 16 line trunk groups. More precisely, a fluctuation internal to the frame, which is essentially caused by delay differences of the line trunk groups, occurs for the associated data frames in the compressed data stream.

If, in addition, a multiplicity of such compression units combine, in each case, 16 line trunk groups, different start and end points are also obtained again for the respective data frames between the compressed data streams.

The present invention is, therefore, directed toward creating a device and a method for equalizing data delays in a multiplicity of serially compressed input data streams, wherein a multiplicity of mutually synchronous data streams are output simultaneously and in phase at the output.

SUMMARY OF THE INVENTION

It is particularly by using a multiplicity of data word synchronization units for synchronizing the multiplicity of input data streams at a data word level into a multiplicity of synchronized parallel input data streams, the synchronizing at data word level representing an insertion or discarding of at least one predetermined code word into the multiplicity of input data streams, that a device and a method for equalizing data delays, in which the data streams output can be output absolutely synchronously and simultaneously without phase shifts are obtained in a relatively simple manner.

A multiplicity of serial/parallel converters are preferably used for converting a compressed serial input data stream into a parallel data stream of the multiplicity of input data streams which allows a data rate of the data stream to be significantly reduced. Before the serial/parallel conversion, the phases of the input data streams are aligned to the internal 184 MHz clock with the aid of so-called phase aligners. Phase aligners are analog circuits which are able to detect a change from 0 to 1, or from 1 to 0 and can then allocate the signal to the preferred phase.

The multiplicity of data word synchronization units, in each case, preferably, consist of variable serial storage units and an associated control unit, as a result of which the serial/parallel converted input data stream can be selectively processed further for different times. The buffers used are a multiplicity of storage devices which can be simultaneously read out via parallel/serial converters which results in a multiplicity of serial data streams at the output which are output exactly synchronously and with identical data frame length.

Additional features and advantages of the present invention are described in, and will be apparent from, the following Detailed Description of the Invention and the Figures.

BRIEF DESCRIPTION OF THE FIGURES

FIG. 2 shows a simplified representation of a data frame which is preferably synchronized in the data delay equalizer according to the present invention.

FIG. 3 shows a simplified block diagram of the data delay equalizer according to the present invention.

FIG. 4 shows a simplified block diagram of a data word synchronization unit used in the data delay equalizer according to the present invention according to FIG. 3.

DETAILED DESCRIPTION OF THE INVENTION

Figure 1:
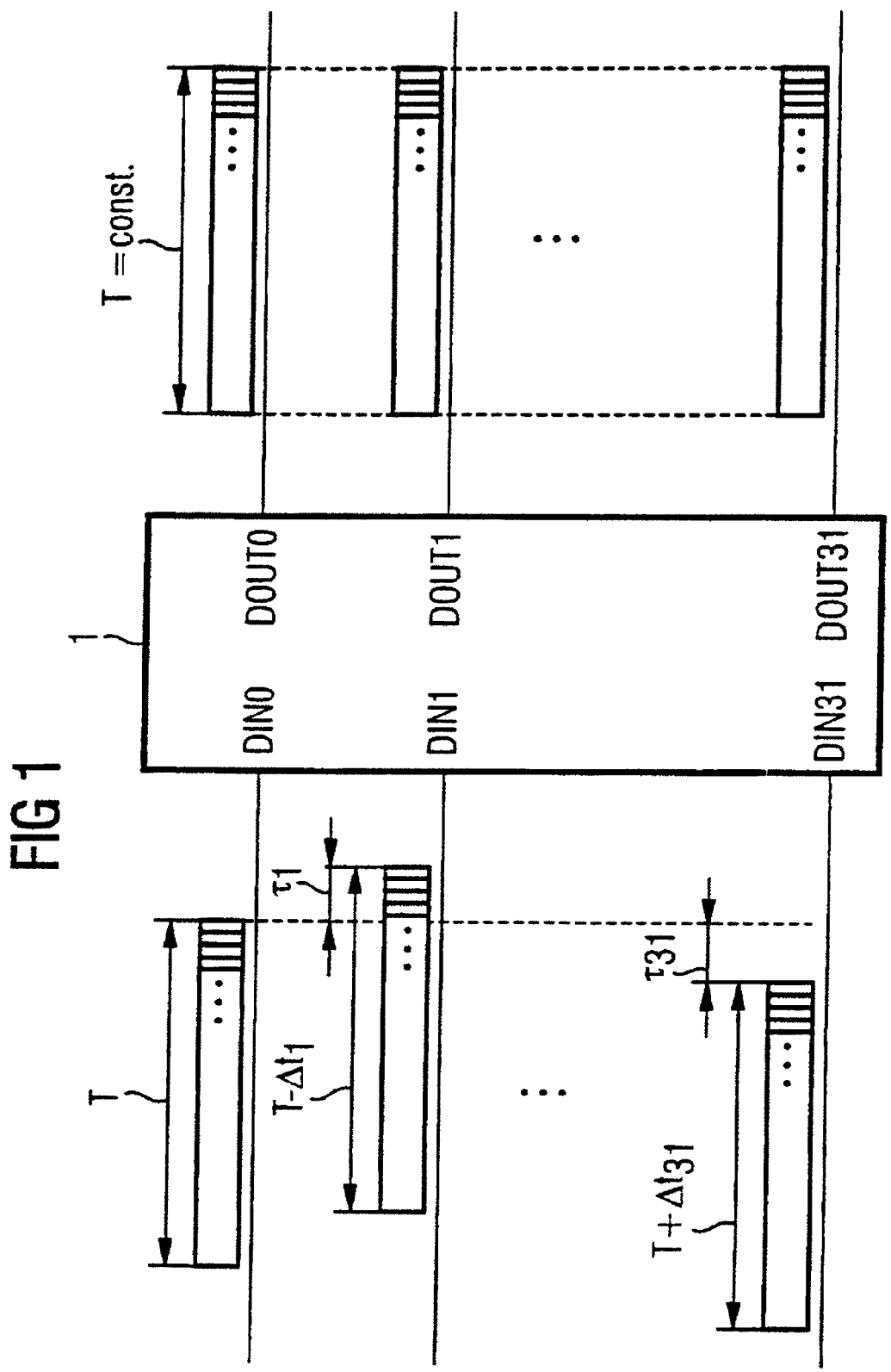
FIG. 1 shows a simplified time representation of input and output data streams for illustrating an operation of the data delay equalizer according to the present invention.

FIG. 1 shows a simplified representation of input and output data streams for illustrating an operation of the data delay equalizer 1 according to the present invention, which is preferably used in a switching network of a telecommunication switching system.

As has already been described in the introduction to the description, the Type D of the Siemens EWSD switching system, for example, has a multiplexer unit (not shown) or compression unit for compressing a data stream supplied via line trunk groups and to be switched. In this arrangement, 16 line trunk groups or their 128 payload channels, respectively, with 64 kbit/s, in each case, are preferably compressed into a data stream of approximately 184 Mbit/s (which has additional test channels and test data). Since, however, respective data channels in the data stream of the line trunk groups can be different with respect to time due to delay differences, data frames which deviate from one another are obtained for a multiplicity of compressed input data streams DIN0, DIN1 to DIN31.

According to FIG. 1, for example, an input data stream DIN0 has a data frame with a correct position in time and a length T. By comparison, however, an input data stream DIN1 can have a data frame which, due to delay differences, has a shortened length $T-\Delta t_1$ and is advanced by a time $\tau_1$ compared with the correct data frame in the input data stream DIN0. In the same way, an input data stream DIN31 can have a data frame $T+\Delta t_{31}$ which is extended compared with the input data stream DIN0 and which, in addition, trails by a time of $\tau_{31}$. The data delay equalizer according to the present invention then equalizes the respective data frames of the input data streams DIN0, DIN1 to DIN31 with different lengths and starting times, in such a manner that they have synchronized data frames with a constant length and the same starting and end point as output data streams DOUT0, DOUT1 to DOUT31. Such synchronized data streams are absolutely necessary if, for example, in a downstream switching network of a telecommunication switching system, a temporal and/or spatial correlation of the data channels existing in the data frames is to take place.

FIG. 2 shows a simplified representation of a frame structure which is obtained, for example, in the input data streams DIN0 to DIN31 and output data streams DOUT0 to DOUT31. According to FIG. 2, data streams of approximately 184 Mbit/s are synchronized and equalized, the data streams consisting of test channels tstch, synw0 to synw3, asw0 to asw9 (2 times 128 data channels) and payload channels payld (16 times 128 data channels). FIG. 2 only shows a section of the complete frame structure (2304 data channels total) and, in particular, the relative channel addresses 5 to 7, 9 to 15, 19 to 31, 33 to 63 and 69 to 126 are not shown in order to simplify the frame structure. Only the further payload channels payld are transmitted via these further relative channel addresses of the synchronous time-division multiplex frame in the switching network.

Accordingly, the time-division multiplex frame shown in FIG. 2 is transmitted with propagation delays shown in FIG. 1 or, respectively, deviations $\Delta t_1$ or $\Delta t_{31}$ internal to the frame and preferably consists of 16×128 payload channels transmitted, for example, by 16 line trunk groups and generated by multiplexer stages, not shown. A key factor for the present invention is, however, the use of at least one predetermined code word which is preferably located in the 2×128=256 test channels. A synchronization data word synw0, which is located at the first position in the data frame, is preferably used for this predetermined code word. However, it is also possible to use the further synchronization data words synw1, synw2, synw3 or another data word of the data frame.

The reason why the synchronization data words synw0 to synw3 are needed is firstly the detection of the frame start, beginning from which the remaining data words or data channels of a respective data frame can be established. In the present invention, however, the predetermined code word synw0 is used for equalizing the aforementioned delay differences, for example, with such an equalization essentially being obtained by discarding or additionally inserting the predetermined code word synw0 into the data stream. In this arrangement, a buffer or variable serial storage unit generates the equalization of the delay differences by temporarily storing a variable volume of data (1 to 4 data words). The insertion or discarding of the code word syncw0 is used for resetting the buffer into its operating state in specific situations (buffer too full or too empty).

FIG. 3 shows a simplified block diagram of the data delay equalizer according to the present invention. According to FIG. 3, the data delay equalizer according to the present invention provides for the synchronization of a multiplicity of input data streams DIN0 to DIN31 to mutually synchronized output data streams DOUT0 to DOUT31. According to FIG. 3, each input data stream DIN0 to DIN31 and the associated output data stream DOUT0 to DOUT31, in each case, has a serial/parallel converter 2, a data word synchronization unit 3, a storage device 4 and a parallel/serial converter 5.

Accordingly, as in FIG. 3, a serial input data stream DIN0 with approximately 184 Mbit/s is supplied to the serial/parallel converter 2 in which a bit-parallel input data stream is generated from the serial input data stream. The serial/parallel converter preferably uses the width of one data word and in the present exemplary embodiment, a 10-bit-wide parallel data stream hsdata is output to the data word synchronization unit 3. To accurately establish a position within a data frame, an address hsadr is also supplied to the data word synchronization unit 3 via a parallel address bus. This results in a considerable reduction of the data rate for the parallel input data stream hsdata and hsadr as a result of which the technical implementation can be simplified; particularly, for the data word synchronization unit.

The serial/parallel converters 2 also generate a data validity signal hsdv which specifies whether valid data are present or not. A clock signal clk92 is the 92 MHz system clock and a clock signal clk184 represents a 184-MHz clock used by the serial/parallel converters and generated by clock doubling by means of a PLL.

The data word synchronization unit 3 synchronizes the parallel input data streams at data word level, in dependence on these data streams or data signals, into synchronized parallel input data streams equdata and equadr which essentially correspond to the unsynchronized input data streams hsdata and hsadr. The synchronization is done essentially via the centrally controlled output of data words. A central synchronization signal or master synchronization signal sync4 with a fixed pattern of 5 clk92 clock pulses controls the output of the data words. Inserting or removing the sync0 code word creates an equalization in the buffer to bring the latter close to its operating state.

The synchronized parallel input data streams equdata and equadr are then temporarily stored in a storage device 4 in such a manner that the parallel/serial converters 5, which read out simultaneously with the master synchronization signal sync4 via read addresses rdadr, can output read data rddata synchronously as output data streams DOUT0 to DOUT31. A write pointer, which is essentially controlled by the data word synchronization unit 3, is independent of a read pointer which is controlled by a unit (not shown) central to all 32 data streams.

Each storage device 4 preferably has 2304 storage cells with a width of 10 bits in each case as a result of which a data volume transmitted in one frame can be completely buffered.

The parallel/serial converters 5 are used for converting the parallel read data rddata into serial output data streams DOUT0 to DOUT31 of again approximately 184 Mbit/s. The output data streams DOUT0 to DOUT31 thus obtained are now completely synchronized to one another and in phase which is why they can be easily correlated in time and space by a downstream switching network.

FIG. 4 shows a simplified block diagram of the data word synchronization unit 3 used in the data delay equalizer 1 according to the present invention. According to FIG. 4, the data word synchronization unit 3 essentially consists of a variable serial storage unit which represents the buffer described above, and a control unit for controlling the serial storage unit. The variable serial storage unit essentially consists of 4 serially connected selection registers 31 to 34 which, in each case, have a register Q1, Q2, Q3 and Q4 and an associated selection stage MUX1, MUX2, MUX3 and MUX4 for selecting different input connections. The selection stages MUX1 and MUX2 of the first two selection registers 31 and 32, in each case, have an input connection h for retaining the data content or data word stored in the register, an input connection i for inserting the predetermined code word synw0, an input connection s for accepting a data content or data word of the next register and an input connection d for accepting actual input data or the parallel input data streams hsdata and hsadr. In the present exemplary embodiment, the selection register 34 only has the input connections h and d. The selection register 33 has the input connections h, s and d.

A state machine 35 essentially controls the selection stages MUX1 to MUX4 of the selection registers 31 to 34 via control signals s1 to s4 and in addition to the selection of the 4 input connections, a blank instruction (don't care) also can be output with none of the input connections described above being activated. Furthermore, an address stored in the first register Q1 and last register Q4 can be detected via detection units or comparator circuits 36 and 37 where preferably an address adr=0 is checked which specifies a position of the predetermined code word synw0 in the data frame. The detection units 36 and 37, together with the state machine 35, constitute the control unit for controlling the variable serial storage unit 31 to 34. The control signals are essentially a master synchronization signal sync4 which, as common synchronization signal, is also used by the parallel/serial converters 5 for reading out the storage devices 4 and is essentially used as reference for writing into the storage device 4, and the signal hsdv which specifies that valid new data must be accepted.

The state machine 35 then controls a so-called fill f0 to f4 of the variable serial storage unit, which represents a FIFO memory according to FIG. 4, in such a manner that, depending on the situation, a frame code word or the predetermined code word synw0 is inserted or removed, or the data or the data stream are simply pushed through. Whereas a read address activated by the central unit continuously runs through or activates the 2304 addresses of the storage device 4, the write address is, in each case, supplied as equadr by the first selection register 31 and, in particular, can skip the address 0 or occupy it twice which results in the read and write pointers approaching or departing. The storage device 4, which preferably consists of a RAM (random access memory), is preferably activated in a time-division multiplex method and writing preferably occurs before reading. As a result, there are no further problems if the read address and the write address are the same.

If the data in the parallel input data stream hsdata and hsadr are too fast (i.e., a signal hsdv indicating this state occurs before the master synchronization signal sync4), the buffer fills by one storage location or one selection register, respectively (Q3, Q2, Q1 contain valid data (only registers Q2 and Q1 contain valid data in normal operation)). If, on the other hand, the input data are too slow (i.e., the master synchronization signal sync4 is already present and the signal hsdv indicates that there are not yet any data), the buffer empties by one storage location (only Q1 still contains valid data). In this manner, the individual data frames are not corrupted and speed differences of up to 0.6 data words/frame can be equalized. It should be pointed out here that too fast or too slow an arrival of data must occur 2304 times before the write pointer passes through the read point at the storage device 4 (or conversely).

In the text which follows, the operation of the data word synchronization unit 3 is described in detail.

In principle, there are five fills f0 to f4 for the variable serial storage units 31 to 34 according to FIG. 3. A fill f0 indicates that there are no data in the registers as is the case, for example, in the initial state. With a fill f1, only the register Q1 contains valid data. With a fill f2, registers Q1 and Q2 contain valid data and with a fill f3, registers Q1 to Q3 and with a fill f4 the registers Q1 to Q4 contain valid data. After switch-on or resetting of the data word synchronization unit 3, fill f0 initially exits. With the next clock pulse, the circuit is brought into fill f2 and the predetermined code word synw0 is inserted into registers Q1 and Q2.

| t   | Q1 = xx    | Q2 = xx    | Q3 = xx | Q4 = xx | (f0) |
|-----|------------|------------|---------|---------|------|
| t+1 | Q1 = synw0 | Q2 = synw0 | Q3 = xx | Q4 = xx | (f2) | hsdv=0: s1=i, s2=i, s3=don't care, s4–don't care,
where t+1 refers to one clock period of the 92-MHz clock signal having started.

If, on the other hand, there are data for the variable serial storage unit (i.e., hsdv=1), the state machine 35 sets the control signals to s1=i, s2=d, s3=s4=don't care, which results in the following state:

| t   | Q1 = xx    | Q2 = xx           | Q3 = xx | Q4 = xx | (f0) |
|-----|------------|-------------------|---------|---------|------|
| t+1 | Q1 = synw0 | Q2 = hsdata+hsadr | Q3 = xx | Q4 = xx | (f2) |

Fill f2 is the normal mode, where the data hsdata and hsadr are shifted through the selection registers 32 and 31.

In the text which follows, the behavior of the data word synchronization unit 3 for various situations deviating from normal mode are described. The data values xx are arbitrary data values produced by the activation instruction "don't care". However, care has been taken that such data are never output out of the register.

If data arrive too slowly, wherein, for example, a new data item or a new data word only arrives after 11 clock pulses of the serial input data stream (184 MHz), the signal hsdv is at zero whereas the master synchronization signal sync4 is already at 1. In this case, the control signal s1=s is output and the other control signals s2 to s4 output the "don't care" instruction.

| t   | Q1 = data1 | Q2 = data2 | Q3 = xx | Q4 = xx | (f2) |
|-----|------------|------------|---------|---------|------|
| t+1 | Q1 = data2 | Q2 = xx    | Q3 = xx | Q4 = xx | (f1) |

If, on the other hand, the data arrive simultaneously, wherein, for example, a new data item arrives after exactly 10 clock pulses of the serial input data stream (184 MHz), the signal hsdv is at 1 and the master synchronization signal sync4 is also at 1. The state machine 35 activates the signals s1 to s4 in such a manner that the following holds true:
s1=s, s2=d, s3 and s4="don't care".

| t   | Q1 = data1 | Q2 = data2        | Q3 = xx | Q4 = xx | (f2) |
|-----|------------|-------------------|---------|---------|------|
| t+1 | Q1 = data2 | Q2 = hsdata+hsadr | Q3 = xx | Q4 = xx | (f2) |

In the case where there are no new data and no new master synchronization signal sync4, the state machine 35 activates the variable serial storage unit in such a manner that the following holds true:
s1=h, s2=h, s3=s4="don't care".

| t   | Q1 = data1 | Q2 = data2 | Q3 = xx | Q4 = xx | (f2) |
|-----|------------|------------|---------|---------|------|
| t+1 | Q1 = data1 | Q2 = data2 | Q3 = xx | Q4 = xx | (f2) |

If, on the other hand, the data are arriving too quickly, wherein, for example, a new data item or data word arrives after only 9 clock pulses of the serial input data stream (184 MHz), the signal hsdv is at 1 and the master synchronization signal sync4 is at 0. The state machine 35 then activates the variable serial storage unit as follows:
s1=h, s2=h, s3=d and s4="don't care".

| t   | Q1 = data1 | Q2 = data2 | Q3 = xx           | Q4 = xx | (f2) |
|-----|------------|------------|-------------------|---------|------|
| t+1 | Q1 = data1 | Q2 = data2 | Q3 = hsdata+hsadr | Q4 = xx | (f3) |

The critical situations occur, in particular, if the data are arriving to quickly in fill f4 (i.e., after 9 clock pulses of the serial input data stream (184 MHz)) or if the data are arriving too slowly in fill f1 (i.e., after 11 clock pulses of the serial input data stream (184 MHz)). With these fills, the address is observed by the detection units 36 and 37 and in the case where the address matches the address of the predetermined code word, a detection signal n1 and n4 is output.

Thus, for example, the data and the master synchronization signal sync4 can arrive at the same time; i.e., a new data item or a new data value arrives after 10 clock pulses of the serial input data stream (184 MHz). The state machine 35 then receives the signals hsdv=1 and sync4=1 and the detection signal n1=0. The variable serial storage unit is then activated as follows:

s1=d and s2=s3=s4="don't care"

| t   | Q1 = data1       | Q2 = xx | Q3 = xx | Q4 = xx | (f1) |
|-----|------------------|---------|---------|---------|------|
| t+1 | Q1 = hsdata+hsadr | Q2 = xx | Q3 = xx | Q4 = xx | (f1) |

If, on the other hand, an address of the predetermined code word is detected by the detection unit 37 in register Q1, i.e. n1=1, and if the signals hsdv=0 and sync4=1 are present, the activation by the state machine 35 is as follows:

s1=h and s2=s3=s4="don't care"

| t   | Q1 = synw0 | Q2 = xx | Q3 = xx | Q4 = xx | (f1) |
|-----|------------|---------|---------|---------|------|
| t+1 | Q1 = synw0 | Q2 = xx | Q3 = xx | Q4 = xx | (f1) |

The case also may occur that the data arrive too slowly and the master synchronization signal sync4 is already present. The signal hsdv is then at 0 and no address of the predetermined code word is detected; i.e., n1=0. In this case, the activation by the state machine 35 is as follows:

s1=h and s2=s3=s4="don't care"

| t   | Q1 = data1 | Q2 = xx | Q3 = xx | Q4 = xx | (f1) |
|-----|------------|---------|---------|---------|------|
| t+1 | Q1 = data1 | Q2 = xx | Q3 = xx | Q4 = xx | (f1) |

In the storage device 4, writing occurs twice to the same address. The write pointer is displaced with respect to the read point.

If, on the other hand, the data are arriving too quickly again (i.e., a new data item is arriving after only 9 clock pulses of the serial input data stream (184 MHz)), the signal hsdv is at 1 and the master synchronization signal sync4 is at 0. The following applies to the state machine 35:

s1=h, s2=d, s3=s4="don't care".

| t   | Q1 = data1 | Q2 = xx             | Q3 = xx | Q4 = xx | (f1) |
|-----|------------|---------------------|---------|---------|------|
| t+1 | Q1 = data1 | Q2 = hsdata+hsadr   | Q3 = xx | Q4 = xx | (f2) |

In the case where there are no new data and no master synchronization signal sync4, the state machine 35 actually should not carry out any activation. If, however, the address of the data item in register Q1 has the address of the predetermined code word, the predetermined code word synw0 is inserted in register Q2 in order to return to normal operation or fill f2, respectively. This is the position at which the synchronization word is inserted. The write pointer is thus displaced in the storage device 4. The signals hsdv and sync4 are then at 0 and the detection unit 37 outputs the signal n1=1. The following then applies for the state machine:

s1=h, s2=i, s3=s4="don't care".

| t   | Q1 = synw0 | Q2 = xx    | Q3 = xx | Q4 = xx | (f1) |
|-----|------------|------------|---------|---------|------|
| t+1 | Q1 = synw0 | Q2 = synw0 | Q3 = xx | Q4 = xx | (f2) |

The case also may occur that the data and the master synchronization signal sync4 arrive at the same time and the address of the data item in register Q4 matches the address of the predetermined code word. This situation is preferably used for creating free space in the storage device 4. The write pointer in the storage device 4 jumps forward by one address without corrupting data because address 0 is skipped which always contains the same data item; i.e., the predetermined code word. This jumping occurs only 4 pulses of the master synchronization signal sync4 later when the data have been shifted through from the selection register 34 to the selection register 31. The signals hsdv, sync4 and n4 are then at 1 and the following applies for the state machine 35:

s1=s, s2=s, s3=d, s4="don't care".

| t   | Q1 = data1 | Q2 = data2 | Q3 = data3         | Q4 = synw0 | (f4) |
|-----|------------|------------|--------------------|------------|------|
| t+1 | Q1 = data2 | Q2 = data3 | Q3 = hsdata+hsadr  | Q4 = xx    | (f3) |

If, on the other hand, the data are too fast again and the register Q4 contains a different data item than the predetermined code word synw0, the new data item is lost and the limit of the variable serial storage unit has been reached. This case results in the signals hsdv=1, sync4=0 and n4=0. The following holds true for the state machine:

s1=h, s2=h, s3=h and s4=h.

| t   | Q1 = data1 | Q2 = data2 | Q3 = data3 | Q4 = data4 | (f4) |
|-----|------------|------------|------------|------------|------|
| t+1 | Q1 = data1 | Q2 = data2 | Q3 = data3 | Q4 = data4 | (f4) |

If, on the other hand, the data are too fast and the register Q4 contains the predetermined code word synw0, the new data item is accepted into register Q4 and the other data are kept in registers Q1 to Q3. As such, the predetermined code word synw0 is overwritten and the write pointer skips the address 0 in the storage device 4. It is still possible to prevent data corruption even in this case. The signals present at the state machine 35 are hsdv=1, sync4=0 and n4=1. Therefore, the following holds true for the state machine:

s1=s2=s3=h and s4=d.

| t   | Q1 = data1 | Q2 = data2 | Q3 = data3 | Q4 = synw0        | (f4) |
|-----|------------|------------|------------|-------------------|------|
| t+1 | Q1 = data1 | Q2 = data2 | Q3 = data3 | Q4 = hsdata+hsadr | (f4) |

In consequence, it is possible to equalize speed differences of 0.6 words/data frame.

In the above text, the present invention has been described via a data frame having 2304 data channels and a data rate of 184 Mbit/s. However, it is not restricted to this and rather includes all further data frames having a number of channels and/or data rates deviating therefrom. In the same manner, the predetermined code word which is implemented by the data word synw0 in the present invention also can be replaced by one other or a number of other data words.

Indeed, although the present invention has been described with reference to specific embodiments, those of skill in the art will recognize that changes may be made thereto without departing from the spirit and scope of the present invention as set forth in the hereafter appended claims.

What is claimed is:

1. A device for equalizing data delays in a plurality of serial input data streams which exhibit at least one predetermined code word in a time-division multiplex system, comprising:

a plurality of serial/parallel converters for converting the plurality of serial input data streams into a plurality of parallel input data streams including data word level addresses;

a plurality of data word synchronization units for synchronizing the plurality of parallel input data streams at a data word level into a plurality of synchronized parallel input data streams, the synchronizing at the data word level representing, separately for each of the plurality of parallel input data streams an insertion/discarding of the at least one predetermined code word into the plurality of parallel input data streams;

a plurality of storage devices for temporarily storing the parallel input data streams synchronized at the data word level; and a plurality of parallel/serial converters for synchronous reading-out of the synchronized parallel input data streams stored in the plurality of storage devices and for converting the synchronized parallel input data streams into a plurality of serial output data streams.

2. A device for equalizing data delays in a plurality of serial input data streams as claimed in claim 1, wherein the plurality of serial/parallel converters also perform a phase alignment of the plurality of input data streams.

3. A device for equalizing data delays in a plurality of serial input data streams as claimed in claim 1, wherein the plurality of data word synchronization units respectively include a variable serial storage unit and a control unit for controlling the serial storage unit.

4. A device for equalizing data delays in a plurality of serial input data streams as claimed in claim 3, wherein each of the variable serial storage units includes a plurality of serially connected registers with associated selection stages for selecting different input connections.

5. A device for equalizing data delays in a plurality of serial input data streams as claimed in claim 4, wherein the different input connections receive as supplied data one of data contained in the associated serially connected register, at least one predetermined code word, data contained in an upstream register and a parallel input data stream.

6. A device for equalizing data delays in a plurality of serial input data streams as claimed in claim 3, wherein the control unit includes a detection unit for detecting an address of the at least one predetermined code word.

7. A device for equalizing data delays in a plurality of serial input data streams as claimed in claim 3, wherein the variable serial storage unit includes a variable FIFO memory.

8. A device for equalizing data delays in a plurality of serial input data streams as claimed in claim 3, wherein the control unit includes a state machine.

9. A method for equalizing data delays in a plurality of serial input data streams which include at least one predetermined code word in a time-division multiplex system, the method comprising the steps of:

converting the plurality of serial input data streams into a plurality of parallel input data streams including data word level addresses;

synchronizing the plurality of parallel input data streams at a data word level into a plurality of synchronized parallel input data streams, the synchronizing at the data word level representing, separately for each of the plurality of parallel input data streams, an insertion/discarding of the at least one predetermined code word into the plurality of parallel input data streams;

storing the parallel input data streams synchronized at the data word level in a plurality of storage devices; and synchronously reading out the synchronized parallel input data steams stored in the plurality of storage devices, and converting the synchronized parallel input data streams into a plurality of serial output data streams.

10. A method for equalizing data delays in a plurality of serial input data streams as claimed in claim 9, wherein the step of converting includes phase alignment of a plurality of input data streams.

11. A method for equalizing data delays in a plurality of serial input data streams as claimed in claim 9, wherein the step of synchronizing includes storing the data words of the parallel input data streams in unoccupied serially connected registers if the data values are present before a master synchronization signal.

12. A method for equalizing data delays in a plurality of serial input data streams as claimed in claim 9, wherein the step of synchronizing includes shifting the data values of the parallel input data stream from occupied serially connected registers if the data values are present after a master clock signal.

13. A method for equalizing data delays in a plurality of serial input data streams as claimed in claim 9, wherein the step of synchronizing includes discarding the predetermined code word as data value if the data values arrive synchronously with a master clock signal and all serially connected registers are occupied.

14. A method for equalizing data delays in a plurality of serial input data streams as claimed in claim 9, wherein the step of synchronizing includes inserting the predetermined code word if it is stored as a data word in one of the serially connected registers and the registers do not have normal occupancy.

* * * * *